ced to the hub. A band 8 having a flange 9 is secured to the inner side of the hub 1 by means of the bolts 5, the flange 9 being held between the hub 1 and the flange 4, the bolts 5 passing through openings formed in the flange 9. The axle box has a hub cap 10 at its outer end.

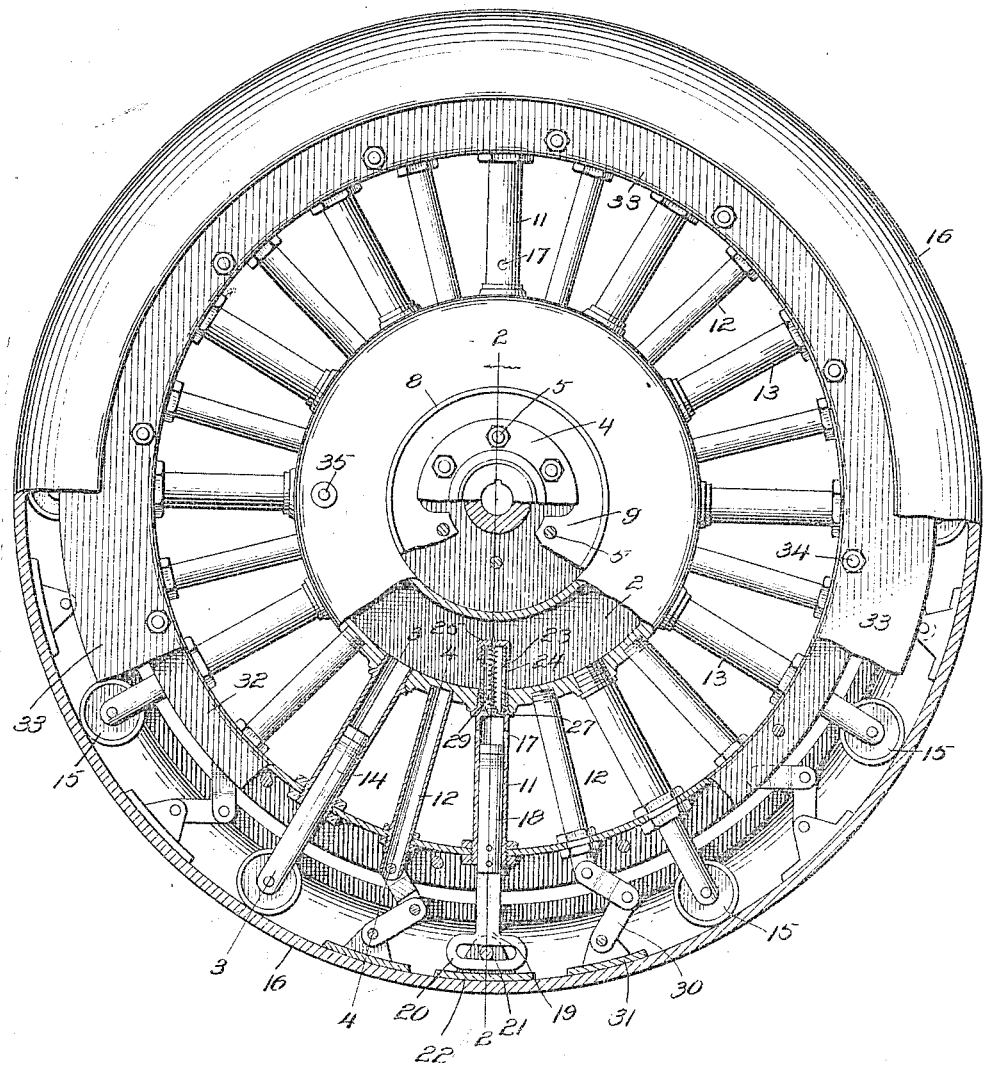

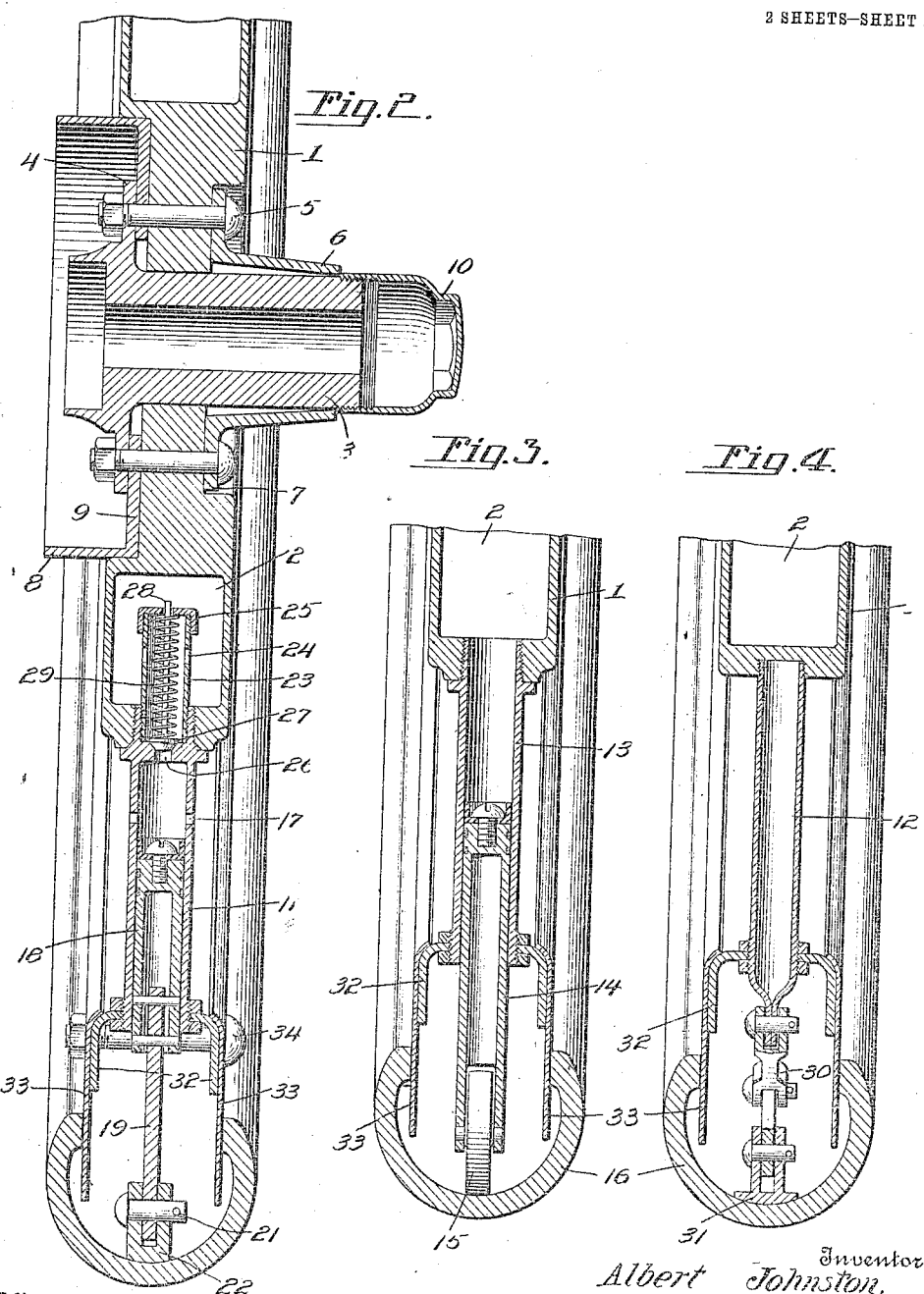

UNITED STATES PATENT OFFICE.

ALBERT JOHNSTON, OF GREAT FALLS, MONTANA.

AUTOMOBILE-WHEEL.

1,051,236.

Specification of Letters Patent. Patented Jan. 21, 1913.

Application filed August 16, 1912. Serial No. 715,478.

*To all whom it may concern:*

Be it known that I, ALBERT JOHNSTON, a citizen of the United States, residing at Great Falls, in the county of Cascade and State of Montana, have invented new and useful Improvements in Automobile-Wheels, of which the following is a specification.

This invention has relation to a vehicle wheel having a tread so as to compensate for shock and vibration and thereby secure ease and comfort to the occupant of the vehicle as well as to minimize the wear upon the rolling stock and machinery.

The invention provides a wheel designed for automobiles and to take the place of the pneumatic tire which is susceptible to puncture, the present invention providing a wheel having a practically non-puncturable tire.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a side view of an automobile wheel embodying the invention, a part of the wheel being in section and portions broken away. Fig. 2 is a transverse section on the line 2—2 of Fig. 1, showing the parts on a larger scale. Fig. 3 is an enlarged section on the line 3—3 of Fig. 1. Fig. 4 is a detail section on the line 4—4 of Fig. 1, showing the parts on a larger scale.

Corresponding and like parts are referred to in the following description, and indicated in all the views of the drawings, by the same reference characters.

The wheel in its general formation embodies a hub, spokes and rim. The hub is indicated at 1 and is formed at its outer edge with an annular chamber 2 and is provided at its center with an opening in which is fitted an axle box 3 having a flange 4 near its inner end to receive bolts 5 by means of which the box is secured to the hub. A band 6, having a flange 7 at its inner end, strengthens the outer end of the axle box, the flange 7 having openings in register with the openings of the flange 4 to receive the bolts 5 which clamp the parts to opposite sides of the hub. A band 8 having a flange 9 is secured to the inner side of the hub 1 by means of the bolts 5, the flange 9 being held between the hub 1 and the flange 4, the bolts 5 passing through openings formed in the flange 9. The axle box has a hub cap 10 at its outer end.

A plurality of spokes are connected at their inner ends with the hub 1, certain spokes opening into the annular chamber 2. The spokes may be divided into three groups or sets which are designated by the respective numerals 11, 12 and 13. The spokes are preferably hollow, although this formation is not essential with the spokes 12. The spokes 11 form pump barrels of air compressors which charge the annular space 2 with air under pressure. The spokes 13 receive plungers 14, which are provided at their outer ends with small wheels 15 which are arranged to travel upon the inner wall of the tire 16. The spokes 11 have openings 17 near their inner ends and receive plungers 18 which are connected with the tire 16 to move therewith, whereby the plungers 18 are caused to reciprocate in the spokes or barrels 11. A stem 19 is connected at its inner end with each of the plungers 18 and has a head 20 at its outer end which is longitudinally slotted to receive a pin 21, which is supported at its ends in side members of a bracket 22 secured to the inner wall of the tire 16. The tire has a limited circumferential movement, hence the necessity of the pin and slot connection between the plunger 18 and the rim. A tube 23 is connected to the inner end of each spoke or pump barrel 11 and has openings 24 in its sides to establish communication between the tube and the annular chamber 2. A cap 25 is threaded to the outer end of the tube 23 and closes the same. The inner end of the spoke or pump barrel is closed by means of a partition in which is formed an opening 26, the end of such opening facing the tube 23 being flared to provide a valve seat against which a valve 27 closes by an outward action. The stem 28 of the valve 27 extends through the tube 23 and through an opening formed in the cap 25 and receives an expansible spring 29 of helical form, said spring serving to hold the valve 27 closed.

Upon the outward movement of the plunger 18 air is drawn into the inner end of the spoke or pump barrel 11 and when the plunger 18 is pressed inward the air is forced from the part 11 into the annular chamber 2. The valve 27 opens to admit the air passing from the compressor into the annular chamber 2 and closes to prevent the escape of such air which is confined to be used in the manner hereinafter described.

Toggle links 30 connect the outer ends of the spokes 12 with the tire 16 and limit the circumferential movement of such tire, while at the same time admitting of the tire moving in and out to compensate for the change of the load sustaining point. Notched brackets 31 are secured to the inner wall of the tire 16 and the outer end of the toggle connection is pivoted thereto.

A rim 32 consisting of a channel iron has the outer ends of the several spokes connected thereto. The rim 32 consists of a channel iron and is arranged with the channel or hollow side facing outward. The tire 16 is also of channel form and is arranged with its hollow or channel side facing inward. Rings 33 are secured at their inner edges to the outer sides of the rim 32 and their outer edge portions engage the inner edges of the tire 16 so as to maintain a close joint therewith and prevent the entrance of dust or other foreign matter into the space formed between the rim 32 and tire 16. The rings 33 are secured to the rim 32 by means of bolts 34.

The inner ends of the spokes or barrels 13 communicate with the annular space 2, hence receive the pressure of the air confined in said annular chamber, said air pressure exerting itself upon the plunger 14 to press the same outward and sustain the load. It will be understood that the tire is sustained by pneumatic pressure, hence is adapted to yield so as to absorb shock and vibration and thereby secure ease and comfort to the occupant of a vehicle equipped with wheels embodying the invention as well as to prevent excessive wear on such vehicle and the machinery thereof. A relief valve 35 provided upon the hub controls the air pressure within the annular chamber 2, thereby admitting of a predetermined pressure being obtained for action upon the plungers 14 to sustain the load.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. A wheel having a movable tire forming a yieldable tread and comprising a hub having an annular space, spokes supported in the hub and having certain spokes in communication with the annular space, a rim having the outer ends of the spokes attached thereto, plungers arranged to operate in certain spokes and having their outer ends arranged to engage the inner wall of the tire, connecting means between certain other spokes and the tire to limit the circumferential play of said tire, and plungers arranged to operate in certain other spokes and having connection with the tire and adapted to charge the annular space of the hub with air under pressure.

2. A wheel of the character described comprising a hub having an annular chamber, a rim, spokes connecting the hub and rim, certain spokes having communication with the annular chamber of the hub, plungers arranged to operate in certain spokes and having their outer ends adapted to engage the tire, toggle links connecting certain other spokes with the tire to limit the circumferential play of the latter, and other plungers arranged to operate in certain spokes and forming air compressors for charging the annular chamber of the hub with air under pressure, said plungers having a pin and slot connection with the tire.

3. A vehicle wheel comprising a hub having an annular chamber, a rim, spokes connecting the hub and rim, tubes connected with the inner ends of certain spokes and extending into the annular chamber of the hub, outwardly closing valves having their stems arranged to operate in the said tubes and closing openings in the inner ends of the spokes provided with the tubes, plungers arranged to operate in said spokes and forming air compressors for charging the annular chamber of the hub with air under pressure, said plungers having connection at their outer ends with the tire, other plungers arranged to operate in certain spokes and provided at their outer ends with wheels to travel against the inner wall of the tire, and toggle connections between the rim and tire to limit the circumferential play of the latter.

4. A vehicle wheel comprising a hub having an annular chamber, a rim, spokes connecting the hub and rim, certain spokes being hollow and in communication with the annular chamber of the hub, plungers arranged to operate in certain spokes and forming air compressors therewith and having slotted heads at their outer ends, pins passing through said slotted heads and connecting them with the tire, plungers arranged to operate in certain spokes and provided at their outer ends with wheels to travel against the inner wall of the tire, and rings secured to the outer sides of the rim and having their outer edge portions touching the inner sides of the edge portions of the tire.

In testimony whereof I affix my signature in presence of two witnesses.

ALBERT JOHNSTON.

Witnesses:
V. B. HILLYARD,
BENNETT S. JONES.